INVENTOR.
TRACY D. NATHAN
BY
ATTORNEY

INVENTOR.
TRACY D. NATHAN
BY
ATTORNEY

3,191,896
VIBRATION PAD

Tracy D. Nathan, Cuyahoga Falls, Ohio, assignor to Hamilton Kent Manufacturing Company, Kent, Ohio, a corporation of Ohio
Filed Mar. 5, 1962, Ser. No. 177,599
1 Claim. (Cl. 248—22)

This invention relates to a vibration pad or cushion to be used as a machine mount and the like. It is extruded, with openings extending through it of such shape and so located that when the pad is subjected to shock or vibratory pressure, the distortion forces to which it is subjected are deflected with minimum extrusion or squeezing, said forces being largely or entirely absorbed in shear.

The pad is made of cured neoprene (chloroprene) or other rubber, preferably a synthetic rubber which is resistant to oil, water and ozone, and is therefore maintenance free. It is substantially non-resonant so that even the forces of any relatively low frequency vibration will be isolated with almost perfest efficiency.

The pad is formed with openings, preferably cylindrical, extending longitudinally through it. The diameter of each of these is about one-third to two-thirds the thickness of the pad, so for a pad ¾-inch thick, openings with a diameter of substantially ¼-inch are preferred. In the preferred pad, these are located equidistant from the top and bottom surfaces of the pad and are spaced somewhat over 1 diameter from one another, so that in a pad ¾-inch thick there is preferably about ½ to 1 inch between centers.

Both above and below these cylindrical openings is a row of laterally elongated apertures, staggered with respect to the cylindrical openings, so that above and below each such opening there is a supporting post. The entire load supported by the pad is borne by these posts. The posts are narrower than the openings so that the load on the upper posts is transmitted to the lower posts through the spaced elastomer portions between the openings.

The openings may be oval instead of cylindrical. They may be substantially rectangular with their corners radiused. The bottom corners of the upper elongated apertures and the upper corners of the bottom elongated apertures are also preferably radiused, so that when subjected to a vibrating load there is no tendency for the pad to crack open at these corners.

The pads are extruded in any usual manner. The top and/or bottom surfaces are preferably grooved, or even perforated, to prevent skidding.

The product is illustrated in the accompanying drawings, in which—

Figure 1:
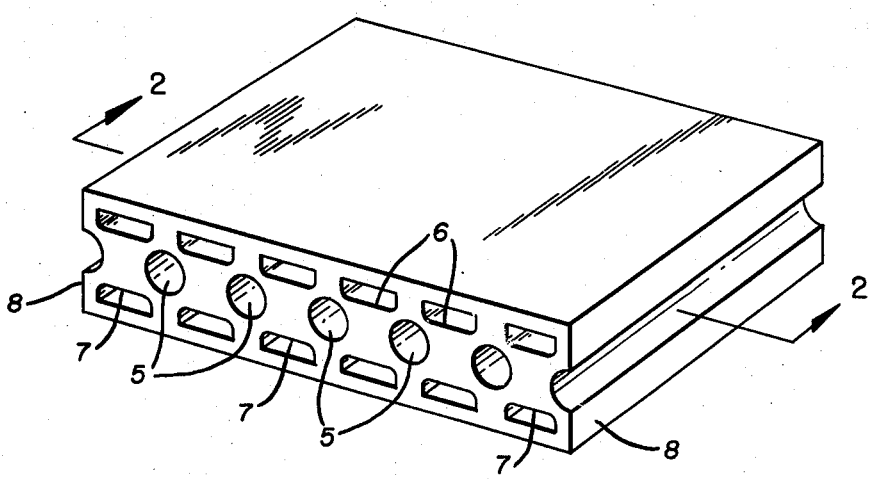
Figure 2:
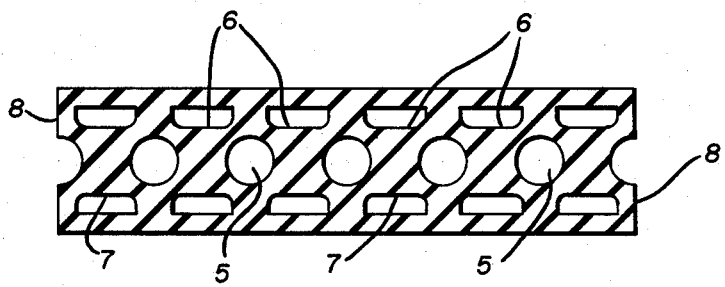
Figure 3:
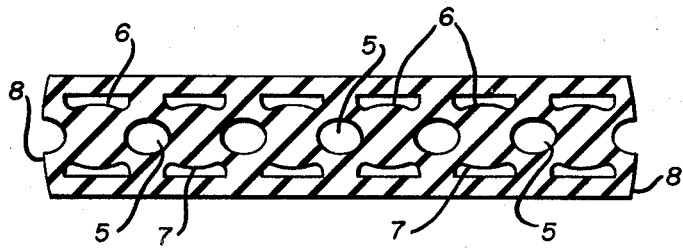
Figure 4:
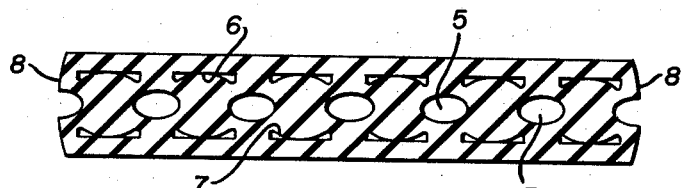

FIGURE 1 is a perspective view of the pad;
FIGURE 2 is a vertical section on the line 2—2 of FIGURE 1, vertical sections at any location in the pad being identical because it is extruded;
FIGURE 3 is a view of the section shown in FIGURE 2 when subjected to a compressive force;
FIGURE 4 is a view of the pad when overloaded; and
FIGURE 5 is a load-deflection curve showing the deflection of the pad when subjected to increasing loads.

The vibration pad is shown in perspective in FIGURE 1. Figures 2–4 show cross sections of the elastomeric pad under gradually increasing compressive weights. These different degrees of compression are illustrated on a smaller scale on the graph of FIGURE 5. The pad is of substantially uniform thickness. The parallel cylindrical openings 5 are separated by blocks of the elastomeric material each of which is joined to the next adjacent block above and below each opening by a continuous connecting portion of the elastomeric material. The connecting portions extend upwardly and downwardly, respectively, to the top and bottom of the pad. There is a wide opening 6 above each block and a wide opening 7 below each block, and each end of each of these wide openings overlaps a cylindrical opening. Thus, when the pad is compressed, the connecting portions are brought nearer together and the top and bottom of each block bulges into the adjacent wide opening before substantial widening of the cylindrical openings occurs.

Figure 5:
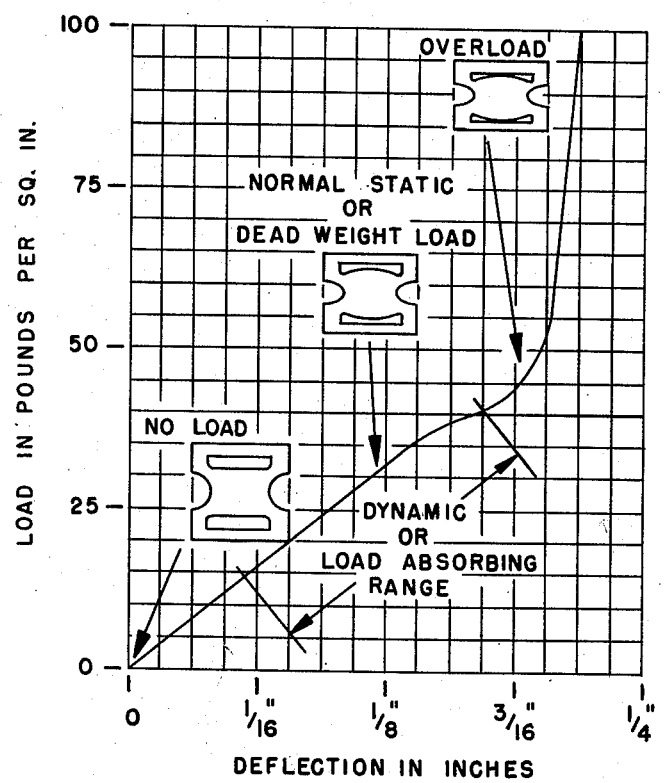

In the curve of FIGURE 5, the load deflection is analyzed to show the effect of loading, and the three inserts illustrate the vertical distortion the pad undergoes with virtually no lateral expansion under the different loadings illustrated by the different sections of the curve.

The curve shows that it is virtually impossible for the pad of this invention to resonate. The tendency for any resilient pad to resonate (and bounce) is a function of the slope of its load-deflection curve. When the disturbing frequency of a machine approaches the natural frequency of the pad, each successive impulse tends to be of greater amplitude. When the amplitude of deflection reaches the condition represented by the dip in the curve, an immediate softness of action is encountered which throws out of phase the natural frequency of the mounted machine and the disturbing frequency of the imposed load.

The difference in action when the dip in the curve is reached, is somewhat similar to the bouncing of a tennis ball on a mattress as compared to bouncing on a cement pavement.

The invention is covered in the claim which follows.
What I claim is:

An extruded elastomeric pad of substantially uniform thickness, a row of parallel cylindrical openings intermediate the top and bottom of the pad each separated by blocks of elastomeric material each of which is joined to the next adjacent block both above and below the intervening cylindrical opening by continuous connecting portions of the elastomeric material which extend across the top and bottom of the pad, respectively, and in which between each two cylindrical openings, both above and below said openings there is a horizontally elongated opening which is wider than the space between the cylindrical openings whereby each end of each elongated opening overlaps the edge of the adjacent cylindrical opening, whereby when an increasing load is placed on the pad the spaces between the respective cylindrical openings and the adjacent elongated openings are narrowed and the tops and bottoms of the blocks bulge into the elongated openings before there is any substantial flattening of the cylindrical openings.

References Cited by the Examiner
UNITED STATES PATENTS 2,727,738  12/55  Lindley _____ 248—22 X
2,958,526  11/60  Ulderup _____ 267—63

FOREIGN PATENTS 723,596  8/42  Germany.

CLAUDE A. LE ROY, *Primary Examiner.*